(12) United States Patent
Kitagawa et al.

(10) Patent No.: US 10,612,147 B2
(45) Date of Patent: Apr. 7, 2020

(54) ELECTROCHEMICAL REACTION DEVICE AND ELECTROCHEMICAL REACTION METHOD

(71) Applicant: KABUSHIKI KAISHA TOSHIBA, Minato-ku (JP)

(72) Inventors: Ryota Kitagawa, Setagaya (JP); Yoshitsune Sugano, Kawasaki (JP); Masakazu Yamagiwa, Yokohama (JP); Jun Tamura, Chuo (JP); Yuki Kudo, Yokohama (JP); Akihiko Ono, Kita (JP); Satoshi Mikoshiba, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 274 days.

(21) Appl. No.: 15/699,689

(22) Filed: Sep. 8, 2017

(65) Prior Publication Data
US 2018/0274113 A1    Sep. 27, 2018

(30) Foreign Application Priority Data

Mar. 21, 2017    (JP) .................................. 2017-054568

(51) Int. Cl.
*C25B 9/00* (2006.01)
*C25B 15/02* (2006.01)
(Continued)

(52) U.S. Cl.
CPC ............... *C25B 15/02* (2013.01); *C25B 1/00* (2013.01); *C25B 1/003* (2013.01); *C25B 1/10* (2013.01);
(Continued)

(58) Field of Classification Search
CPC ..... C25B 15/02; C25B 11/04; C25B 11/0473; C25B 11/0405; C25B 3/04
See application file for complete search history.

(56) References Cited

U.S. PATENT DOCUMENTS 6,797,134 B2 * 9/2004 Weinberg .................. C25B 1/02
204/229.5
2014/0048419 A1    2/2014 Fouda-Onana et al.
(Continued)

FOREIGN PATENT DOCUMENTS

JP    2003-249230    9/2003
JP    3655349    6/2005
(Continued)

OTHER PUBLICATIONS

Extended European Search Report dated Mar. 29, 2018 in European Patent Application No. 17190095.4, 8 pages.
(Continued)

*Primary Examiner* — Arun S Phasge
(74) *Attorney, Agent, or Firm* — Oblon, McClelland, Maier & Neustadt, L.L.P.

(57) ABSTRACT

An electrochemical reaction device of an embodiment includes: a reaction tank which includes a first storage storing a first electrolytic solution containing carbon dioxide, and a second storage storing a second electrolytic solution containing water; a reduction electrode which is disposed at the first storage, an oxidation electrode which is disposed at the second storage; a counter electrode which is used for potential sweep using the reduction electrode as a working electrode; a first power supply which is electrically connected to the reduction electrode and the oxidation electrode, to generate a reduction reaction and an oxidation reaction; and a second power supply which is electrically connected to the reduction electrode and the counter electrode, to sweep a potential while setting an oxidation potential of the reduction electrode or less as an upper limit potential.

7 Claims, 11 Drawing Sheets

(51) Int. Cl.
*C25B 9/08* (2006.01)
*C25B 1/00* (2006.01)
*C25B 3/04* (2006.01)
*C25B 11/04* (2006.01)
*C25B 1/10* (2006.01)
*C25B 9/10* (2006.01)

(52) U.S. Cl.
CPC .................. *C25B 3/04* (2013.01); *C25B 9/08* (2013.01); *C25B 9/10* (2013.01); *C25B 11/04* (2013.01); *C25B 11/0405* (2013.01); *C25B 11/0415* (2013.01); *C25B 11/0473* (2013.01); *Y02E 60/366* (2013.01)

(56) References Cited

U.S. PATENT DOCUMENTS

| | | |
|---|---|---|
| 2015/0197866 A1 | 7/2015 | Toyoda et al. |
| 2015/0321929 A1 | 11/2015 | Legzdins |
| 2016/0145752 A1 | 5/2016 | Salehi et al. |
| 2016/0376713 A1 | 12/2016 | Ono et al. |
| 2017/0073825 A1 | 3/2017 | Sugano et al. |

FOREIGN PATENT DOCUMENTS

| | | |
|---|---|---|
| JP | 2013-256679 | 12/2013 |
| JP | 2014-516389 | 7/2014 |
| JP | 2015-148010 | 8/2015 |
| JP | 2016-507354 | 3/2016 |
| JP | 2016-102239 | 6/2016 |
| WO | WO 2011/132375 A1 | 10/2011 |
| WO | WO 2015/178019 A1 | 11/2015 |

OTHER PUBLICATIONS

Ryuichi Shiratsuchi et al., "Pulsed Electroreduction of $CO_2$ on Copper Electrodes", J. Electrochem. Soc., vol. 140, No. 12; Dec. 1996; pp. 3479-3482.

P. Kedzierzawski et al., "Poisoning and Activation of the Gold Cathode during Electroreduction of $CO_2$", J. Electrochem. Soc., vol. 141, No. 5; May 1994; pp. L58-L60.

* cited by examiner

ELECTROCHEMICAL REACTION DEVICE AND ELECTROCHEMICAL REACTION METHOD

CROSS-REFERENCE TO RELATED APPLICATION

This application is based upon and claims the benefit of priority from Japanese Patent Application No. 2017-054568, filed on Mar. 21, 2017; the entire contents of which are incorporated herein by reference.

FIELD

Embodiments described herein generally relate to an electrochemical reaction device and an electrochemical reaction method.

BACKGROUND

There has been developed an artificial photosynthesis technology that replicates photosynthesis of plants and electrochemically reduces carbon dioxide by artificially using renewable energy such as sunlight to produce a storable chemical energy source from viewpoints of energy problems and environmental problems. An electrochemical reaction device that enables the artificial photosynthesis technology includes, for example, a photoelectric conversion layer using a semiconductor, an oxidation electrode that oxidizes water ($H_2O$) to generate oxygen ($O_2$), and a reduction electrode that reduces carbon dioxide ($CO_2$) to generate carbon compounds. In such an electrochemical reaction device, the oxidation electrode and the reduction electrode which are electrically connected to the photoelectric conversion layer are immersed in a solution (electrolytic solution) containing water in which $CO_2$ is dissolved, to cause a reduction reaction of $CO_2$.

The oxidation electrode has, for example, a structure in which an oxidation catalyst which oxidizes $H_2O$ is provided on a surface of a metal base material. The reduction electrode has, for example, a structure in which a reduction catalyst which reduces $CO_2$ is provided on a surface of a carbon base material. The oxidation electrode and the reduction electrode are electrically connected to, for example, a renewable energy power supply such as a solar cell. The reduction electrode obtains a $CO_2$ reduction potential from the solar cell, thereby reducing $CO_2$ to generate carbon compounds such as carbon monoxide (CO), formic acid (HCOOH), methanol ($CH_3OH$), methane ($CH_4$), ethanol ($C_2H_5OH$), ethane ($C_2H_6$), and ethylene glycol ($C_2H_6O_2$).

There is a problem that a production amount of a reduction product of $CO_2$ is easy to be continuously lowered when the above-stated reaction where $CO_2$ is electrochemically reduced is carried out for a long time. As a method to solve the problem, it is proposed to recover the production amount of the reduction product of $CO_2$ by electrochemically processing the reduction electrode. For example, when the reduction reaction of $CO_2$ is electrochemically driven, it has been reported that the production amount of the reduction product of $CO_2$ is maintained by applying voltage or potential in a step state. However, the reduction electrode is damaged by repeating the reactivation process as stated above. Accordingly, it is impossible to stably operate the electrochemical reaction device for a long time such as, for example, for 100 hours or more according to the conventional reactivation process.

DETAILED DESCRIPTION

According to the embodiments of the present invention, there is provided an electrochemical reaction device that includes: a reaction tank which includes a first storage to store a first electrolytic solution containing carbon dioxide, and a second storage to store a second electrolytic solution containing water; a reduction electrode, which is disposed at the first storage of the reaction tank, to reduce carbon dioxide and thus generate a carbon compound; an oxidation electrode, which is disposed at the second storage of the reaction tank, to oxidize water and thus generate oxygen; a counter electrode which is used for potential sweep using the reduction electrode as a working electrode; a first power supply, which is electrically connected to the reduction electrode and the oxidation electrode, to generate the carbon compound and oxygen; and a second power supply, which is electrically connected to the reduction electrode and the counter electrode, to sweep a potential while setting an oxidation potential of the reduction electrode or less as an upper limit potential.

Hereinafter, an electrochemical reaction device and an electrochemical reaction method of an embodiment are described with reference to the drawings. In the embodiments, substantially the same constituent elements are denoted by the same reference signs and a description thereof will be omitted in some cases. The drawings are schematic, and a relation of the thickness and the planar dimension of each part, a thickness ratio among parts, and so on may differ from actual ones.

Figure 1:
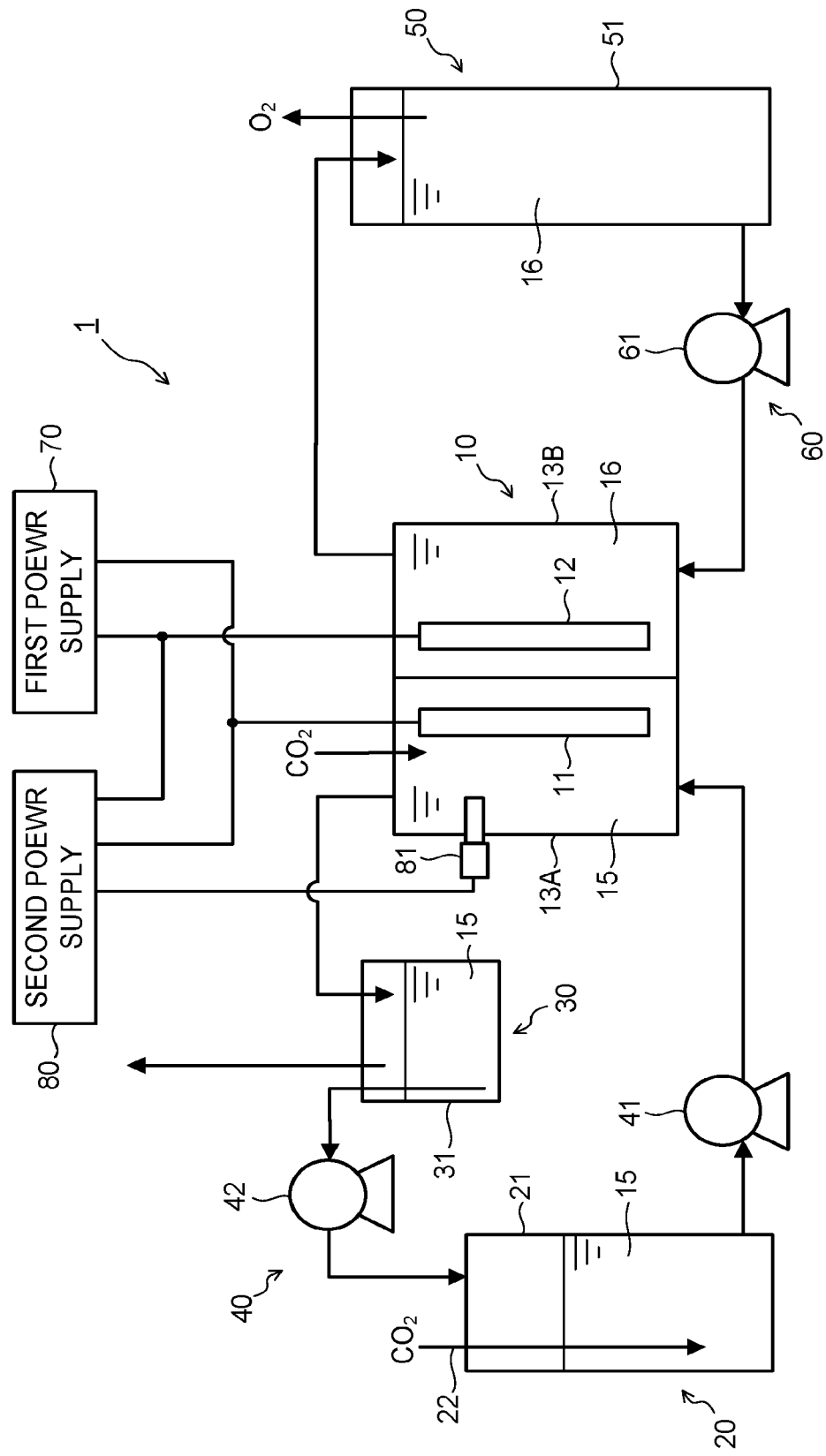
FIG. 1 is a view illustrating an electrochemical reaction device of an embodiment.

FIG. 1 is a view illustrating an electrochemical reaction device of an embodiment. An electrochemical reaction device illustrated in FIG. 1 includes: an electrochemical reaction cell 10 which has a reduction electrode 11 and an oxidation electrode 12; a gas/liquid mixing unit 20 which dissolves or mixes carbon dioxide ($CO_2$) in a first electrolytic solution for reduction reaction; a first gas/liquid separation unit 30 which separates a carbon compound generated by a reduction reaction of $CO_2$ from the first electrolytic solution; a first circulating system 40 which circulates the first electrolytic solution among the electrochemical reaction cell 10, the gas/liquid mixing unit 20, and the first gas/liquid separation unit 30; a second gas/liquid separation unit 50 which separates oxygen ($O_2$) generated by an oxidation reaction of water ($H_2O$) from a second electrolytic solution for oxidation reaction; a second circulating system 60 which circulates the second electrolytic solution between the electrochemical reaction cell 10 and the second gas/liquid separation unit 50; a first power supply 70 which applies an electric current to generate an oxidation reduction reaction in the electrochemical reaction cell 10; and a second power supply 80 which applies potential sweep using the reduction electrode 11 of the electrochemical reaction cell 10 as a working electrode.

Figure 2:
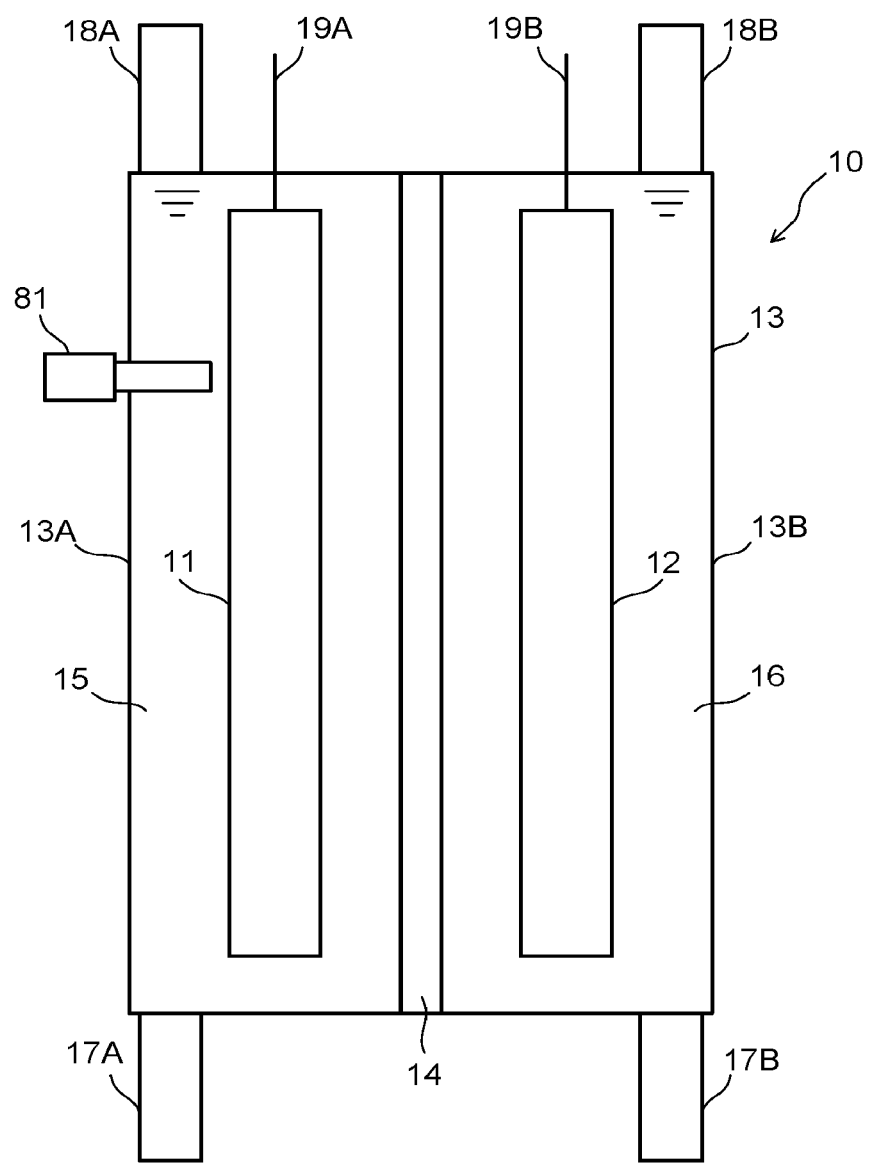
FIG. 2 is a view illustrating an electrochemical reaction cell in the electrochemical reaction device illustrated in FIG. 1.

As illustrated in FIG. 2, the electrochemical reaction cell 10 includes a reaction tank 13 which has a first storage (reduction electrode chamber) 13A where the reduction electrode 11 reducing $CO_2$ is disposed and a second storage (oxidation electrode chamber) 13B where the oxidation electrode 12 oxidizing $H_2O$ is disposed. The first storage 13A and the second storage 13B are separated with a separator capable of moving ions such as an ion exchange membrane 14. A first electrolytic solution 15 is filled in the first storage 13A such that the reduction electrode 11 is immersed. A second electrolytic solution 16 is filled in the second storage 13B such that the oxidation electrode 12 is immersed. Note that a state where the reduction electrode 11 and the oxidation electrode 12 are disposed separately from the ion exchange membrane 14 is illustrated in FIG. 2, but they may be each disposed to be in contact with the ion exchange membrane 14 so as to reduce a solution resistance between the electrodes 11, 12.

A first inflow port 17A which introduces the first electrolytic solution 15 containing $CO_2$ and a first outlet port 18A which discharges the first electrolytic solution 15 containing a carbon compound (reduction reaction product) generated by the reduction reaction of $CO_2$ are connected to the first storage 13A. A second inflow port 17B which introduces the second electrolytic solution 16 containing water and a second outlet port 18B which discharges the second electrolytic solution 16 containing oxygen ($O_2$) (oxidation reaction product) generated by the oxidation reaction of water ($H_2O$) are connected to the second storage 13B. The outlet ports 18A, 18B are preferably located at an upstream side than respective electrodes 11, 12 so as to efficiently discharge gaseous products generated at the reduction electrode 11 and the oxidation electrode 12. Flow paths may be formed at the first and second storages 13A, 13B so as to efficiently introduce and discharge respective electrolytic solutions 15, 16. Besides, an inlet port of $CO_2$ may be provided at the first storage 13A to directly introduce $CO_2$ to the first storage 13A so as to subsidiary supply $CO_2$.

The reduction electrode 11 and the oxidation electrode 12 respectively include connection terminals 19A, 19B so as to enable an electrical connection to an outside of the reaction tank 13. The reduction electrode 11 and the oxidation electrode 12 are connected to the first power supply 70 respectively through the connection terminals 19A, 19B. In the electrochemical reaction cell 10, electric power (energy) is input from the first power supply 70 to the reduction electrode 11 and the oxidation electrode 12, the reduction reaction of $CO_2$ occurs at the reduction electrode 11, and the oxidation reaction of $H_2O$ occurs at the oxidation electrode 12. The first power supply 70 may be a power source supplying electric power generated by renewable energy such as sunlight, wind power, geothermal power, and tidal power without being limited to a system power supply, a battery, and so on. The power source derived from the renewable energy is preferably used from an environmental viewpoint. When the system power supply or the wind power energy is used as the first power supply 70, it is converted into direct current by using an inverter because it is an alternating-current power supply, and then the electric power is input to the electrochemical reaction cell 10. A drive system of the electrochemical reaction cell 10 may be a constant voltage system or a constant current system. The electrochemical reaction cell 10 is preferably operated under a pressurized state or under a temperature adjusted state to enable high-efficiency electrochemical reaction cell 10.

Further, the reduction electrode 11 and the oxidation electrode 12 are respectively connected to the second power supply 80 through the connection terminals 19A, 19B. The second power supply 80 is used as a power supply to reactivate lowering or the like of the production amount of the reduction product at the reduction electrode 11. The reactivation process is carried out by sweeping a specific potential while using the reduction electrode 11 as a working electrode. A counter electrode for the potential sweep may be the oxidation electrode 12, or may be provided separately. The potential sweep is preferably applied in a three-electrode system using a reference electrode 81. Accordingly, the electrochemical reaction cell 10 includes the reference electrode 81. The second power supply 80 is connected to the reduction electrode 11 as the working electrode, the oxidation electrode 12 as the counter electrode, and the reference electrode 81. The counter electrode may be separately provided from the oxidation electrode 12. Besides, if it is possible to apply a certain potential to the reduction electrode 11, the potential sweep may be applied in a two-electrode system. In this case, the working electrode may be the reduction electrode 11 and the oxidation electrode 12 may be set as the counter electrode, or the counter electrode may be separately provided. Note that if the first power supply 70 is a power supply capable of controlling the potential, the first power supply 70 may also function as the second power supply 80.

The reduction electrode 11 is immersed in the first electrolytic solution 15. The reduction electrode 11 contains a reduction catalyst of $CO_2$ as a substance to be reduced. As the reduction catalyst, a material lowering activation energy to reduce $CO_2$, in other words, a material lowering overvoltage when the carbon compound is generated by the reduction reaction of $CO_2$ is used. As such a material, there can be used, for example, a metal material and a carbon material. As the metal material, for example, there can be used metals such as gold, copper, silver, platinum, palladium, zinc, mercury, indium, nickel, or an alloy containing these metals. As the carbon material, there can be used, for example, graphene, carbon nanotube (CNT), fullerene, ketjen black, and so on. The reduction catalyst is not limited thereto, and there can be also used, for example, metal complexes such as an Ru complex and an Re complex, organic molecules having an imidazole skeleton and a pyridine skeleton as the reduction catalyst. Besides, the reduction catalyst may be a mixture of a plurality of materials. The reduction electrode 11 may have, for example, a structure where the reduction catalyst is provided on a conductive base material in a thin-film state, a lattice state, a particle state, a wired state, or the like.

As the products obtained by the reduction reaction of $CO_2$, there can be cited, for example, carbon compounds such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO) and ethylene glycol ($C_2H_6O_2$), though they differ depending on a kind of the reduction catalyst. Besides, there is also a case when hydrogen ($H_2$) is subsidiarily generated by the reduction of $H_2O$. The product obtained by the reduction reaction is recovered through the first outlet port 18A.

The oxidation electrode 12 is immersed in the second electrolytic solution 16. The oxidation electrode 12 contains an oxidation catalyst of $H_2O$ as a substance to be oxidized. As the oxidation catalyst, a material lowering activation energy to oxidize $H_2O$, in other words, a material lowering overvoltage when oxygen and hydrogen ions are generated by the oxidation reaction of $H_2O$ is used. As such a material, there can be cited, for example, metals such as ruthenium, iridium, platinum, cobalt, nickel, iron, and manganese. Besides, as the oxidation catalyst, there can be used binary metal oxides, ternary metal oxides, quaternary metal oxides, and so on. As the binary metal oxides, there can be cited, for example, manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. As the ternary metal oxides, there can be cited, for example, Ni—Fe—O, Ni—Co—O, La—Co—O, Ni—La—O, Sr—Fe—O, and so on. As the quaternary metal oxides, there can be cited, for example, Pb—Ru—Ir—O, La—Sr—Co—O, and so on. Note that the oxidation catalysts are not limited thereto, and there can also be used metal hydroxides containing cobalt, nickel, iron, manganese, and so on, and the metal complexes such as the Ru complex and an Fe complex as the oxidation catalyst. Besides, a plurality of materials may be mixed to be used.

Besides, the oxidation electrode 12 may be a composite material containing both the oxidation catalyst and a conductive material. As the conductive material, there can be cited, for example, the carbon materials such as carbon black, activated carbon, fullerene, carbon nanotube, graphene, ketjen black, and diamond, transparent conductive oxides such as indium tin oxide (ITO), zinc oxide (ZnO), fluorine-doped tin oxide (FTO), aluminum-doped zinc oxide (AZO), and antimony-doped tin oxide (ATO), metals such as Cu, Al, Ti, Ni, Ag, W, Co, and Au, and alloys containing at least one of these metals. The product obtained by the oxidation reaction is, for example, oxygen. Oxygen generated by the oxidation reaction is recovered through the second outlet port 18B.

The reference electrode 81 which is used when the potential sweep for the reduction electrode 11 is applied may be one formed of any materials as long as it is a material capable of being used as an electrode material such as platinum, gold, silver, copper, SUS, and carbon. Besides, it is also possible to use the reference electrode which is used for an electrochemical measurement such as a silver-silver chloride electrode, a calomel electrode, and a mercury-mercury oxide electrode. At this time, a material where the electrode in itself is dissolved may be used as the reference electrode 81, and it is also possible to finish up the material every time. When it is required to continuously use the material, it is desirable that the electrode material is a renewable or fillable material or a system, from a viewpoint of reaction progress.

As the ion exchange membrane 14, there can be used, for example, Neosepta (registered trademark) of Astom Corporation, Selemion (registered trademark), Aciplex (registered trademark) of Asahi Glass Corporation, Ltd., Fumasep (registered trademark), fumapem (registered trademark) of Fumatech Corporation, Nafion (registered trademark) of DuPont Corporation being a fluorocarbon resin where tetrafluoroethylene is sulfonated and polymerized, lewabrane (registered trademark) of LANXESS Corporation, IONSEP (registered trademark) of IONTECH Corporation, Mustang (registered trademark) of PALL Corporation, ralex (registered trademark) of mega Corporation, Gore-Tex (registered trademark) of Gore-Tex Corporation, and so on. Besides, the ion exchange membrane 14 may be formed by using a membrane whose basic structure is hydrocarbon, or a membrane having an amine group in anion exchange. When there is a pH difference between the first electrolytic solution 15 and the second electrolytic solution 16, it is possible to use the electrolytic solutions under a state where the pH values of the respective electrolytic solutions are stably maintained by using a bipolar membrane where a cation exchange membrane and an anion exchange membrane are stacked.

Besides, for example, a silicone resin, a fluorine-based resin (perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylene-chlorotrifluoroethylene copolymer (ECTFE), and so on), and a ceramic porous membrane may be used as the separator with the exception of the ion exchange membrane 14. In particular, a hydrophilic porous membrane is preferable as the separator because clogging due to air bubbles does not occur. Note that the separator (diaphragm) is not necessarily provided.

The first electrolytic solution 15 is preferably a solution having a high $CO_2$ absorptance. An existing form of $CO_2$ in the first electrolytic solution 15 is not necessarily limited to a dissolved state, and $CO_2$ in an air bubble state may be mixed to exist in the first electrolytic solution 15. As an aqueous electrolytic solution, there can be cited, for example, an aqueous solution where an electrolyte such as $LiHCO_3$, $NaHCO_3$, $KHCO_3$, or $C_sHCO_3$ is dissolved. As a nonaqueous electrolytic solution, there can be cited, for example, alcohols such as methanol, ethanol, and acetone. The solution containing $CO_2$ as the first electrolytic solution 15 is desirably an electrolytic solution containing a $CO_2$ absorbent which lowers a reduction potential of $CO_2$, has high ion conductivity, and absorbs $CO_2$.

As the above-stated electrolytic solution, there can be cited, an ionic liquid which is made of salts of cations such as imidazolium ions or pyridinium ions and anions such as $BF_4^-$ or $PF_6^-$ and which is in a liquid state in a wide temperature range, or aqueous solutions thereof. As other electrolytic solutions, there can be cited amine solutions such as ethanolamine, imidazole, pyridine, or aqueous solutions thereof. As amine, there may be any of primary amine, secondary amine, and tertiary amine. As the primary amine, there can be cited methylamine, ethylamine, propyl amine, butylamine, pentylamine, hexylamine, and so on. Hydrocarbons of the amine may be substituted by alcohol, halogen, and so on. As amine whose hydrocarbons are substituted, there can be cited methanolamine, ethanolamine, chloromethyl amine, and so on. Further, an unsaturated bond may exist. These hydrocarbons are also applied to the secondary amine and the tertiary amine. As the secondary amine, there can be cited dimethylamine, diethylamine, dipropylamine, dibutylamine, dipentylamine, dihexylamine, dimethanolamine, diethanolamine, dipropanolamine, and so on. The substituted hydrocarbons may be different. This also applies to the tertiary amine. For example, as examples whose hydrocarbons are different, there can be cited methylethylamine, methylpropylamine, and so on. As the tertiary amine, there can be cited trimethylamine, triethylamine, tripropylamine, tributylamine, trihexylamine, trimethanolamine, triethanolamine, tripropanolamine, tributanolamine, tripropanolamine, triexanolamine, methyldiethylamine, methyldipropylamine, and so on. As the cations of the ionic liquid, there can be cited 1-ethyl-3-methylimidazolium ions, 1-methyl-3-propylimidazolium ions, 1-butyl-3-methylimidazole ions, 1-methyl-3-pentylimidazolium ions, 1-hexyl-3-methylimidazolium ions, and so on. A second place of the imidazolium ions may be substituted. As the cations whose second place of the imidazolium ions is substituted, there can be cited 1-ethyl-2,3-dimethylimidazolium ions, 1,2-dimethyl-3-propylimidazolium ions, 1-butyl-2,3-dimethylimidazolium ions, 1,2-dimethyl-3-pentylimidazolium ions, 1-hexyl-2,3-dimethylimidazolium ions, and so on. As the pyridinium ions, there can be cited methylpyridinium, ethylpyridinium, propylpyridinium, butylpyridinium, pentylpyridinium, hexylpyridinium, and so on. In both of the imidazolium ions and the pyridinium ions, an alkyl group may be substituted, or an unsaturated bond may exist. As the anions, there can be cited fluoride ions, chloride ions, bromide ions, iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(trifluoromethoxysulfonyl)imide, bis(perfluoroethylsulfonyl)imide, and so on. Dipolar ions in which the cations and the anions of the ionic liquid are coupled by hydrocarbons may be used.

As the second electrolytic solution 16, a solution containing $H_2O$ is used. As the solution containing $H_2O$, it is preferable that an aqueous solution containing an arbitrary electrolyte is used. As the aqueous solution containing the electrolyte, there can be cited aqueous solutions containing phosphate ions ($PO_4^{2-}$), borate ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO^{3-}$), and so on. The solution containing $CO_2$ and the solution containing $H_2O$ may be the same or different. The solution common to the first electrolytic solution 15 can be used as long as it is the solution containing $H_2O$.

The gas/liquid mixing unit 20 is to dissolve or mix $CO_2$ in the first electrolytic solution 15. The gas/liquid mixing unit 20 includes a liquid tank 21 storing the first electrolytic solution 15 and a $CO_2$ supply system 22 supplying $CO_2$ to the first electrolytic solution 15 in the liquid tank 21 to dissolve or mix $CO_2$. The first electrolytic solution 15 where $CO_2$ is dissolved or mixed in the liquid tank 21 is sent to the first storage 13A of the electrochemical reaction cell 10 by a first pump 41 of the first circulating system 40. The reduction reaction of $CO_2$ is carried out at the first storage 13A, then the first electrolytic solution 15 containing the carbon compound being the reduction reaction product of $CO_2$ is sent to a gas/liquid separation tank 31 of the first gas/liquid separation unit 30. A gaseous product such as CO separated at the first gas/liquid separation unit 30 is accumulated at a product collecting part which is not illustrated in the drawing. The first electrolytic solution 15 from which the gaseous product is separated at the first gas/liquid separation unit 30 is then sent to the liquid tank 21 of the gas/liquid mixing unit 20 by a second pump 42 of the first circulating system 40. The first electrolytic solution 15 is thereby circulated among the gas/liquid mixing unit 20, the electrochemical reaction cell 10, and the first gas/liquid separation unit 30.

The second gas/liquid separation unit 50 is to separate $O_2$ generated by the oxidation reaction of $H_2O$ from the second electrolytic solution 16. The oxidation reaction of $H_2O$ is carried out at the second storage 13B, then the second electrolytic solution 16 containing $O_2$ being the oxidation reaction product of $H_2O$ is sent to the second gas/liquid separation unit 50. The second gas/liquid separation unit 50 includes a gas/liquid separation tank 51, and $O_2$ contained in the second electrolytic solution 16 is separated. A gaseous product such as $O_2$ separated at the second gas/liquid separation unit 50 is accumulated at a product collecting part which is not illustrated in the drawing. The second electrolytic solution 16 from which the gaseous product is separated at the second gas/liquid separation unit 50 is then sent to the second storage 13B of the electrochemical reaction cell 10 by a pump 61 of the second circulating system 60. The second electrolytic solution 16 is thereby circulated between the electrochemical reaction cell 10 and the second gas/liquid separation unit 50. Note that pipes sending the gaseous product may connect between the electrochemical reaction cell 10 and the first and second gas/liquid separation units 30, 50 in addition to pipes sending the electrolytic solutions 15, 16.

Next, operations and an oxidation reduction reaction of the electrochemical reaction device 1 are described. Here, a case when carbon monoxide (CO) is generated as the carbon compound is mainly described, but the carbon compound as the reduction product of carbon dioxide is not limited to carbon monoxide, and may be other carbon compounds as described above. When electric power is supplied from the first power supply 70 between the reduction electrode 11 and the oxidation electrode 12, the oxidation reaction of water ($H_2O$) occurs at the oxidation electrode 12 which is in contact with the second electrolytic solution 16. Specifically, $H_2O$ contained in the second electrolytic solution 16 is oxidized as shown in the following expression (1), and oxygen ($O_2$) and hydrogen ions ($H^+$) are generated.

$$2H_2O \rightarrow 4H^+ + O_2 + 4e^- \tag{1}$$

$H^+$ generated at the oxidation electrode 12 moves among the second electrolytic solution 16, the ion exchange membrane 14, and the first electrolytic solution 15 to reach in the vicinity of the reduction electrode 11. The reduction reaction of carbon dioxide ($CO_2$) occurs due to electrons (e) based on the current supplied from the first power supply 70 to the reduction electrode 11 and $H^+$ moved in the vicinity of the reduction electrode 11. Specifically, $CO_2$ existing in the first electrolytic solution 15 is reduced as shown in the following expression (2), and CO is generated.

$$2CO_2 + 4H^+ + 4e^- \rightarrow 2CO + 2H_2O \tag{2}$$

As the above-described reduction reaction of $CO_2$ and oxidation reaction of $H_2O$ proceed, for example, reactive intermediates, impurities in the electrolytic solution, components of a base material, and so on are adhered to the reduction electrode 11, and gradients in a proton concentration (pH) and in a $CO_2$ concentration occur in the vicinity of the reduction electrode 11. They may be a factor lowering a production amount of CO or the like being the reduction product of $CO_2$, or lowering selectivity of the reduction products. Accordingly, a reactivation process of the reduction electrode 11 is carried out by using the second power supply 80 after the input of the electric power by the first power supply 70 is stopped. The reactivation process of the reduction electrode 11 is carried out by sweeping a potential in a certain range for the reduction electrode 11 as the working electrode and the counter electrode by using the second power supply 80. It is thereby possible to recover the production amount and selectivity of the reduction products, or a current value.

The potential sweep for the reduction electrode 11 is preferably applied between two-point potentials. The potential sweep has an effect of removing the reactive intermediates and impurities adhered to a reaction point of the reduction electrode 11 and functions to eliminate the gradients in the proton concentration (pH) and the $CO_2$ concentration formed in the vicinity of the reduction electrode 11 resulting from the operation by the first power supply 70. Between the two-point potentials in the potential sweep, a higher potential is set as an upper potential, and a lower potential is set as a lower potential, then the upper potential is desirably set to be a potential which do not cause oxidation to occur at a catalyst and a base material forming the reduction electrode 11, that is, a potential which does not damage the reduction electrode 11.

Figure 3:
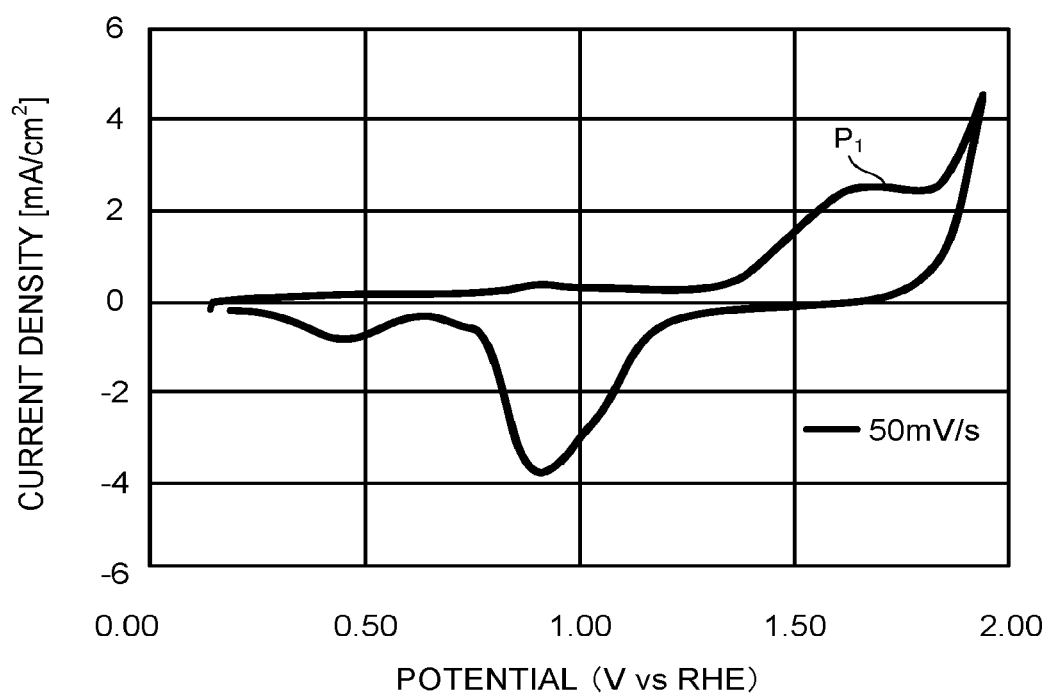
FIG. 3 is a view illustrating an example of a cyclic voltammogram (CV) of a reduction electrode in the electrochemical reaction device illustrated in FIG. 1.

A cyclic voltammogram (CV) of the reduction electrode 11 which is formed of gold and carbon is illustrated in FIG. 3. A measurement of the CV was carried out by using the reduction electrode 11 as the working electrode, Pt as the counter electrode, and an Ag/AgCl (3M NaCl) electrode as the reference electrode in 0.5 M aqueous potassium hydrogen carbonate solution (pH=7.2) where $CO_2$ is saturated. The potential sweep was applied while setting the lower potential at 0.14 V (vs.RHE) and the upper potential at 1.94 V (vs.RHE), and at a sweep rate of 50 mV/s. Here, the potential is an RHE (reversible hydrogen electrode) reference, and it is calculated according to the following expression.

$$E(vs.\text{RHE}) = E_{AV} + E_{RE} + 0.0591 \times pH$$

Here, $E_{AV}$ denotes an applied potential, $E_{RE}$ denotes an electrode potential of the reference potential, and pH denotes a pH value of the electrolytic solution where the reference electrode exists.

It can be seen from FIG. 3 that the current increases from around 1.3 V (vs.RHE) when the potential of the reduction electrode 11 is swept in a positive direction. This results from oxidation of gold and carbon, and generation of oxygen from the reduction electrode 11, and when a potential higher than this rising potential is applied, some damages may occur at the reduction electrode 11. For example, a peak P1 around 1.6 V (vs.RHE) in the drawing is an oxidation peak of Au forming the reduction electrode. When an upper limit value of the upper potential (hereinafter, it is called as an upper limit potential) is set to a potential higher than P1, it is accompanied by alteration of a surface structure of Au. It is also the same regarding a case when the potential is swept up to a potential higher than the above-described potential where the oxidation of gold and carbon occurs and the oxygen is generated from the reduction electrode 11 (around 1.3 V (vs.RHE)), and the reduction electrode 11 is thereby damaged. Accordingly, the potential sweep of the reduction electrode 11 is applied while setting a potential at the oxidation potential of the reduction electrode 11 or less as the upper limit potential.

Figure 4:
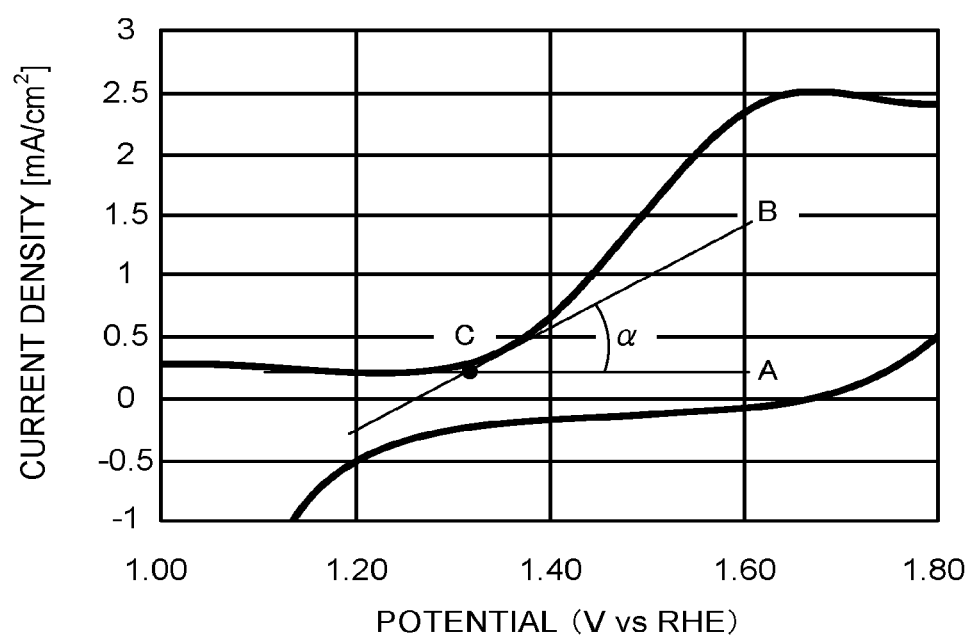
FIG. 4 is a view to explain how to find an oxidation potential of the reduction electrode in the cyclic voltammogram illustrated in FIG. 3.

As a determination method of the upper limit potential in the potential sweep of the reduction electrode 11, for example, there can be cited a method setting a potential at an intersection C between a line A and a line B as a rising potential, and determining this potential as the oxidation potential of the reduction electrode 11 as illustrated in FIG. 4. At this time, an angle α formed by the line A and the line B is defined to be, for example, 30 degrees, 45 degrees, 60 degrees as a matter of convenience, then the rising potential can be easily determined. As illustrated in FIG. 4, the rising potential is over 1.3 V (vs.RHE) and 1.4 V (vs.RHE) or less. Accordingly, when the reduction electrode 11 formed of gold and carbon is used, it is preferable that the upper limit potential is set to 1.4 V (vs.RHE), and the potential sweep is applied between two points of the upper potential which is the upper limit potential or less and the lower potential.

Figure 5:
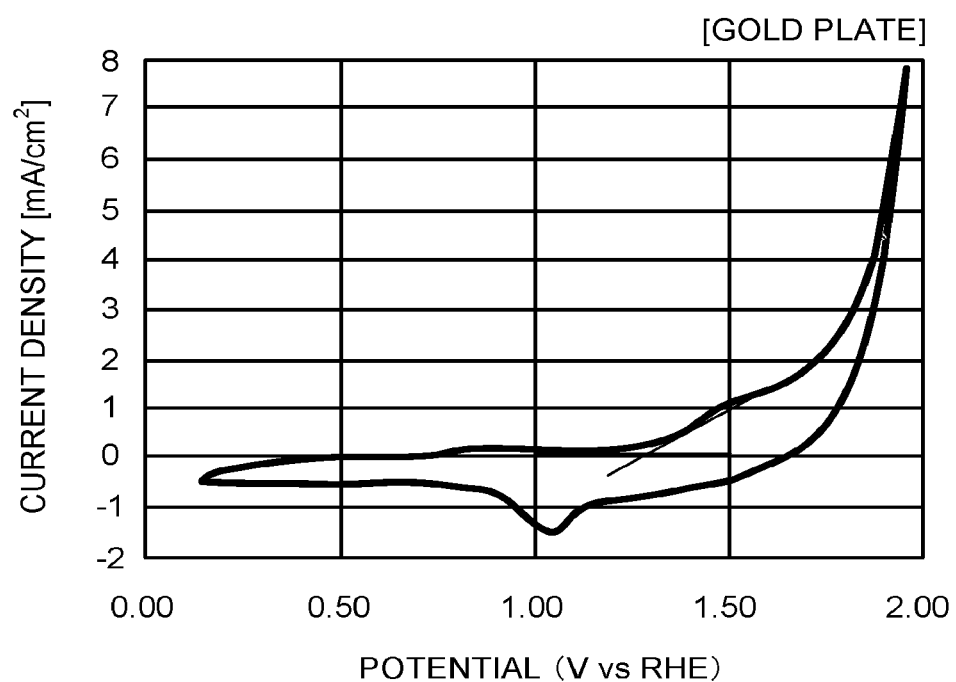
FIG. 5 is a view illustrating another example of how to find the oxidation potential of the reduction electrode.
Figure 6:
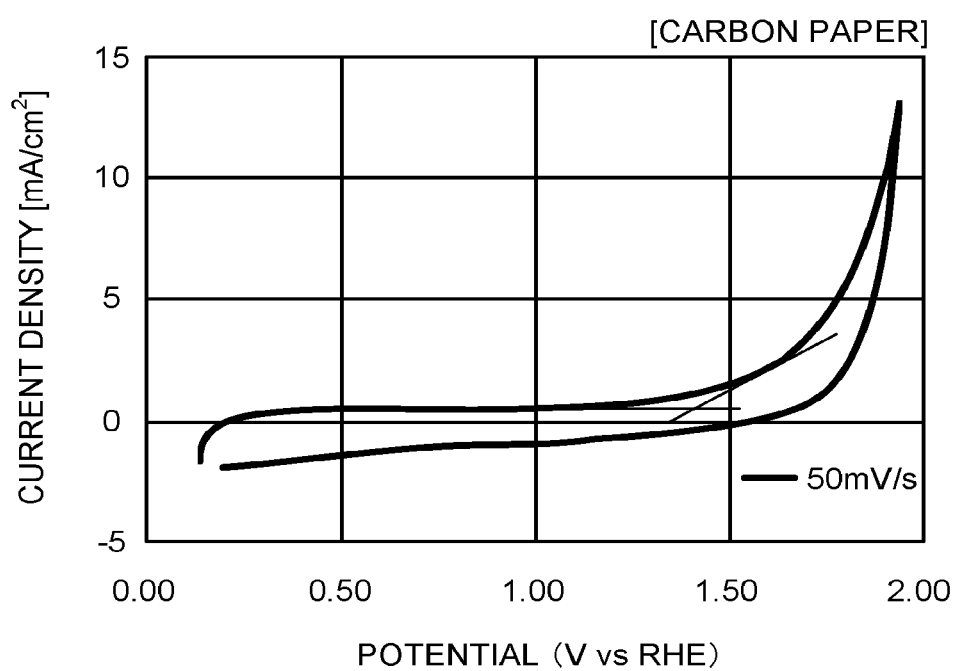
FIG. 6 is a view illustrating the other example of how to find the oxidation potential of the reduction electrode.

As another determination method of the upper limit potential, the CV measurements regarding respective members forming the reduction electrode 11 are carried out, the oxidation potentials of the respective members are calculated, and the lowest potential is determined as the upper limit potential, without determining the upper limit potential by performing the CV measurement of the reduction electrode 11. FIG. 5 and FIG. 6 respectively illustrate CV spectra of a gold plate and a carbon paper. The measurements were performed under the same condition as that of FIG. 4. The rising potentials were calculated as same as FIG. 4, then they were 1.30 V (vs.RHE) in the gold plate (FIG. 5), and 1.28 V (vs.RHE) in the carbon paper (FIG. 6). Note that both rising potentials (oxidation potential) were determined while setting the angle α formed by the line A and the line B at 30 degrees. In this case, it is preferable that the upper limit potential is set at 1.28 V (vs.RHE), and the upper potential is set to be the upper limit potential or less.

The upper potential in the potential sweep of the reduction electrode 11 may be set to the above-described upper limit potential or less. Note that when the upper potential is too low, the reactivation effect of the reduction electrode 11 cannot be sufficiently obtained. Accordingly, when the reduction electrode 11 formed of gold and carbon is used, the upper potential is preferably set to 0.93 V (vs.RHE) or more, and it is thereby possible to sufficiently obtain the reactivation effect of the reduction electrode 11 in the potential sweep. That is, when the reduction electrode 11 formed of gold and carbon is used, the potential sweep is preferably applied between two points of the upper potential and the lower potential at 0.93 V (vs.RHE) or more and 1.4 V (vs.RHE) or less. It is thereby possible to sufficiently obtain the reactivation effect of the reduction electrode 11 while suppressing the damage due to the oxidation of the reduction electrode 11.

Figure 7:
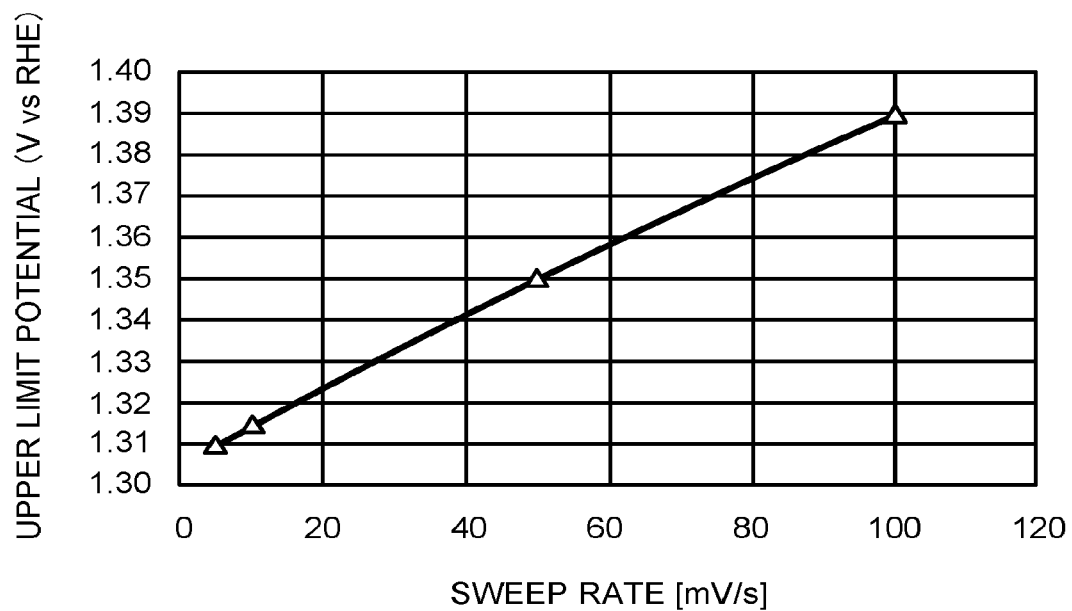
FIG. 7 is a view illustrating an example of a relationship between a sweep rate and an upper limit potential in potential sweep of the reduction electrode.

Besides, a value of the upper limit potential is affected by the sweep rate, and therefore, the upper limit potential is preferably determined in consideration of the sweep rate. FIG. 7 is a view where the values of the upper limit potential of the reduction electrode 11 formed of gold and carbon are plotted when the sweep rate was changed. The measurement was performed under the same condition as FIG. 4. It can be seen from FIG. 7 that the upper limit potential becomes larger approximately linearly as the sweep rate becomes larger. A linear expression obtained by performing a straight-line approximation is as described below.

$$\text{Upper limit potential } V_{UR} = 4 \times 10^{-4} \times \text{sweep potential (mV/s)} - 1.3063$$

Accordingly, when the upper limit potential is determined by the above-stated method, it is desirable to determine by using a data where the sweep rate is unified. Besides, when the sweep rate at the CV measurement time and the sweep rate at the potential sweep time are different, it is preferable to use a value converted from the above-described expression of the upper limit potential $V_{UR}$.

The lower potential when the potential sweep of the reduction electrode 11 is applied is preferably a potential which is applied to the reduction electrode 11 when it is operated by the first power supply 70 or more. When the sweep is carried out at the lower potential which is lower than the above-stated potential, more adsorbed species are formed at an active site of the reduction electrode 11, and there is a possibility that a sufficient recovery effect of the reduction electrode 11 cannot be obtained. Besides, when the lower potential is too high, a potential difference from the upper potential becomes small, and there is a possibility that the reactivation effect by the potential sweep cannot be sufficiently obtained. Accordingly, it is preferable to set the lower potential such that the difference from the upper potential is 0.1 V or more. When the reduction electrode 11 formed of gold and carbon is used, the lower potential is preferably set at 0.83 V (vs.RHE) or less.

Hereinabove, though the reduction electrode 11 formed of gold and carbon is described, it is preferable to apply the potential sweep by similarly determining the upper limit potential regarding the reduction electrode 11 using the electrode materials other than the above, and setting the upper potential and the lower potential in consideration of the upper limit potential. That is, it is preferable that the upper limit potential is determined by the CV measurement of the reduction electrode 11 or the CV measurement of the composing materials of the reduction electrode 11, and the potential sweep is applied between two points of the upper potential which is the determined upper limit potential or less and the lower potential. A lower limit value of the upper potential is preferably set at a potential which is lower than the upper limit potential for approximately 0.5 V, for example. Besides, the lower potential is preferably set such that the difference from the upper potential is 0.1 V or more.

The sweep rate when the potential sweep of the reduction electrode 11 is applied affects an operation time of the electrochemical reaction device 1, and the reactivation process can be carried out in a shorter time as the sweep rate is faster. Note that when the sweep rate is too fast, there is a possibility that the recovery effect cannot be sufficiently obtained because the reduction electrode 11 cannot sufficiently respond to the potential. Accordingly, the potential sweep rate is preferably 1 mV/s or more and 1000 mV/s or less, and more preferably 10 mV/s or more and 100 mV/s or less.

A direction of the potential sweep is not particularly limited, and it may be swept in a direction from the upper potential to the lower potential, or may be swept in a direction from the lower potential to the upper potential. Besides, a start point may be set to the lower potential and an end point may be set to the upper potential or they may be set oppositely as long as the sweep is applied for a plurality of times between two potentials. When the sweep is repeated, the start point and the end point may be the same potential. Besides, the sweep between the two potentials may be linearly or a step state. The potential sweep for the reduction electrode 11 is preferably applied for one time or more, respectively in a range between the upper potential and the lower potential. At this time, a current value flowing between the electrodes is preferably measured. When the potential sweep is repeatedly applied between the upper potential and the lower potential, it is preferable to apply the potential sweep until a change of current value during the reaction becomes approximately constant.

Figure 8:
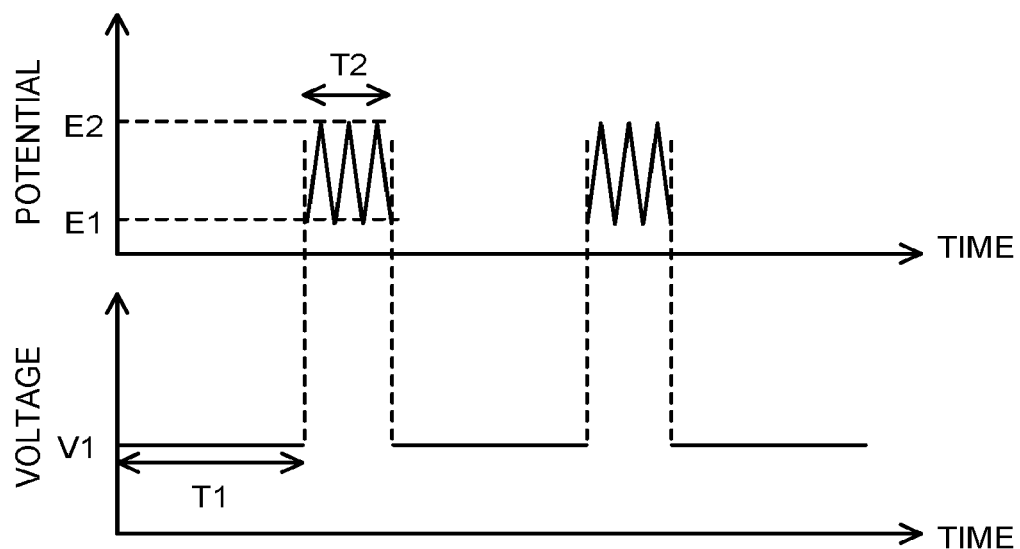
FIG. 8 is a view illustrating an example of an operation state in the electrochemical reaction device of the embodiment.
Figure 9:
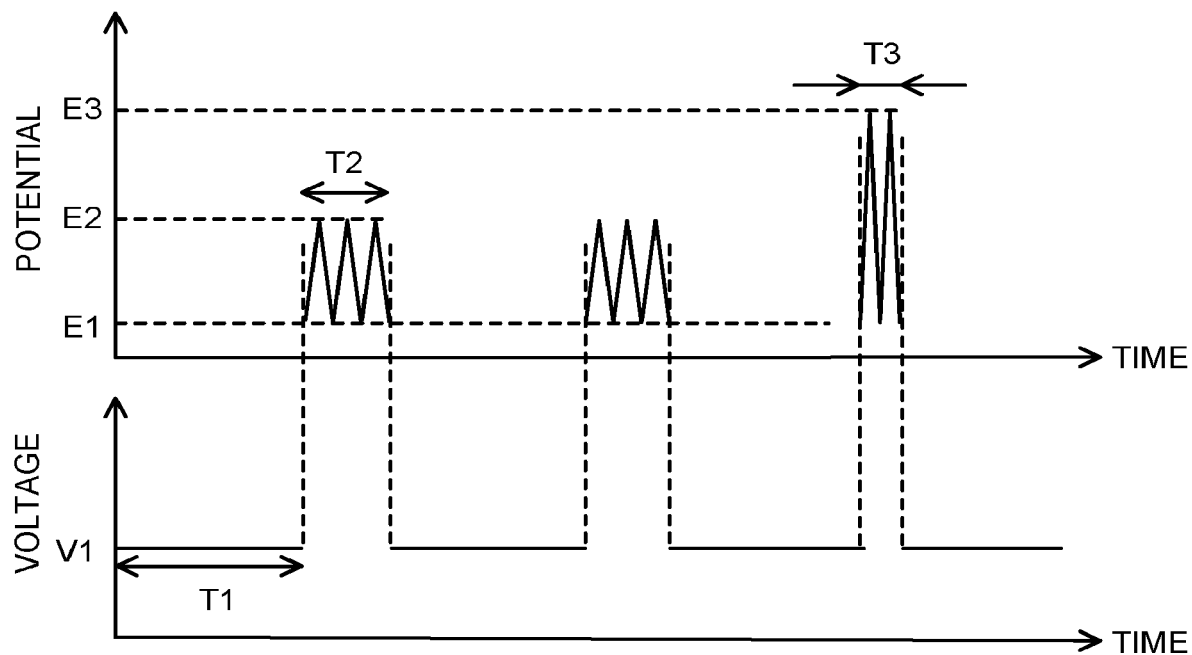
FIG. 9 is a view illustrating another example of the operation state in the electrochemical reaction device of the embodiment.

Next, an operation method of the electrochemical reaction device 1 of the embodiment is described with reference to FIG. 8 and FIG. 9. FIG. 8 illustrates a relationship between the operation by the first power supply 70 and the operation by the second power supply 80. There are described cases when the operation by the first power supply 70 is performed by, for example, applying a constant voltage V1 to the reduction electrode 11 and the oxidation electrode 12, and when the operation by the second power supply 80 is performed by, for example, applying the potential sweep for the reduction electrode 11 between a lower potential E1 and an upper potential E2 by a three-electrode system using the reference electrode 81. The first electrolytic solution 15 is introduced into the first storage 13A of the reaction tank 13 where the reduction electrode 11 is disposed, and the second electrolytic solution 16 is introduced into the second storage 13B where the oxidation electrode 12 is disposed. The constant voltage V1 is applied to the reduction electrode 11 and the oxidation electrode 12 from the first power supply 70 under this state, and the reduction reaction is carried out at the reduction electrode 11 and the oxidation reaction is carried out at the oxidation electrode 12.

The above-stated operation carrying out the reduction reaction and the oxidation reaction is performed for a predetermined time (time T1), then the first power supply 70 is turned off, and thereafter, the second power supply 80 is turned on to apply the potential sweep between the lower potential E1 and the upper potential E2 for a predetermined time (time T2) while using the reduction electrode 11 as the working electrode. The upper potential E2 is set while setting a potential which is the oxidation potential of the reduction electrode 11 or less as the upper limit potential. The reduction electrode 11 is reactivated by the potential sweep as stated above. The operation by the first power supply 70 is to generate the reduction reaction of $CO_2$, and the operation by the second power supply 80 has a role to recover lowering of continuous production efficiency. Accordingly, it is preferable that the operation time T1 by the first power supply 70 is longer than the operation time T2 by the second power supply 80 in consideration of the production amount and the production efficiency of the reduction reaction product of $CO_2$ by the electrochemical reaction device 1. The operation by the second power supply 80 may be performed in accordance with a predetermined program. Otherwise, for example, a composition of the product generated from the reduction electrode 11 is monitored, and the operation by the second power supply 80 may be performed when the composition does not satisfy a normal concentration.

There is a case when the lowering of the production efficiency by the reduction electrode 11 is incurred due to mixed causes. In a short term, the lowering occurs due to the above-stated adsorption of reactive intermediates and the concentration gradients of $CO_2$ and proton (pH) formed in the vicinity of the reduction electrode 11. In a long term, the lowering occurs due to, for example, contamination from the reduction electrode 11 in itself, and for example, adhesion of carbon being the base material to Au. There is a case when the long term lowering factor of the production efficiency cannot be recovered by the potential sweep applied between the lower potential E1 and the upper potential E2. In this case, it is preferable to electrochemically oxidize the adherent of the reduction electrode 11 to be removed by expanding a sweep range to a potential E3 which is higher than the upper potential E2 by changing the operation condition of the second power supply 80 as illustrated in FIG. 9. That is, it is preferable to apply a second potential sweep step performed between the lower potential E1 and the upper potential E3 which exceeds the upper limit potential of the reduction electrode 11 in addition to a first potential sweep step performed between the lower potential E1 and the upper potential E2.

Note that there is a possibility that the reduction electrode 11 is damaged if a potential higher than the potential E2 is applied for the reduction electrode 11 as described above, and therefore, it is preferable to apply the potential sweep between the lower potential E1 and the upper potential E3 within a minimum process time. Accordingly, an operation time T3 of the second potential sweep step between the lower potential E1 and the upper potential E3 is preferably shorter than the operation time T2 of the first potential sweep step between the lower potential E1 and the upper potential E2. When the second potential sweep step is performed, it is preferable that the operation time T1 by the first power supply 70, the operation time T2 of the first potential sweep step, and the operation time T3 of the second potential sweep step satisfy a relationship of T1>T2>T3. When the second potential sweep step is performed, the operation by the second power supply 80 may be performed according to a predetermined program. Otherwise, the composition of the product generated from the reduction electrode 11 is monitored, and the operation by the second power supply 80 may be performed when the normal concentration is not satisfied.

The electrochemical reaction device 1 of the embodiment includes the second power supply 80 which is capable of conducting the reactivation process of the reduction electrode 11 by applying the potential sweep while setting the potential which is the oxidation potential or less not damaging the reduction electrode 11 as the upper limit potential. Accordingly, it is possible to reactivate the reduction electrode 11 without damaging the reduction electrode 11 even when the production amount of CO or the like being the reduction product of $CO_2$ is lowered or the selectivity of the reduction products is lowered due to the adhesion of the reactivity intermediates and impurities to the reduction electrode 11 and the gradients in the proton concentration (pH) and the $CO_2$ concentration occurred in the vicinity of the reduction electrode 11. The damage of the reduction electrode 11 due to oxidation becomes a factor to lower the reduction reaction efficiency of $CO_2$ in a long term. It is therefore possible for the electrochemical reaction device 1 of the embodiment to stably carry out the reduction reaction of $CO_2$ in a long term while suppressing the lowering of the production amount of the reduction product of $CO_2$ and the lowering of the selectivity of the reduction products in a short term. Note that the embodiment shows the electrochemical reaction device 1 having the reduction electrode 11 and the oxidation electrode 12 disposed in the reaction tank 13, but is not limited this. The embodiment can also apply to a case which the first electrolytic solution 15 containing $CO_2$ is contact with the reduction electrode 11 and the second electrolytic solution 16 containing water is contact with the oxidation electrode 12. In such a case, each of the first and second electrolytic solutions 15, 16 is supplied through a flow pass.

EXAMPLES

Next, concrete examples of the present invention and evaluation results are described.

Example 1

Figure 10:
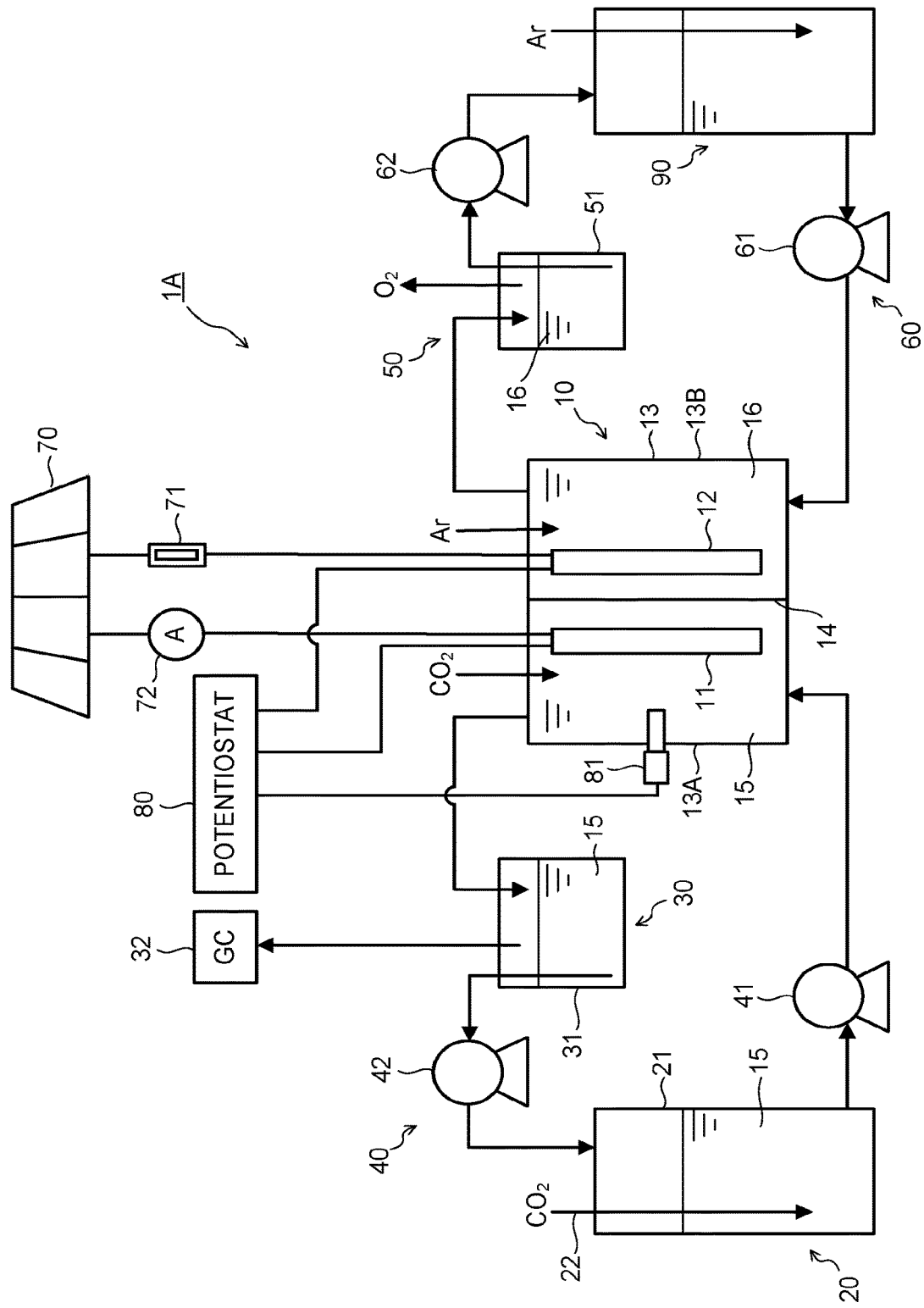
FIG. 10 is a view illustrating an electrochemical reaction device of an example 1.

In an example 1, a solar cell was used as the first power supply 70, a potentiostat is used as the second power supply 80 to evaluate the electrochemical reaction device 1. A configuration of the device used in the example 1 is illustrated in FIG. 10. An electrochemical reaction device 1A illustrated in FIG. 10 includes the electrochemical reaction cell 10, the first gas/liquid mixing unit 20, the first gas/liquid separation unit 30, the first circulating system 40, the second gas/liquid separation unit 50, the second circulating system 60, the solar cell as the first power supply 70, and the potentiostat as the second power supply 80 as same as the electrochemical reaction device 1 illustrated in FIG. 1. Further, a second gas/liquid mixing unit 90 is provided at the second circulating system 60. An opening/closing switch 71 and an ammeter 72 are provided at wirings between the solar cell 70 and the electrochemical reaction cell 10. The first gas/liquid separation unit 30 includes a gas chromatograph 32 which analyzes a composition of a separated gaseous product.

An acrylic reaction vessel 13 was used for the electrochemical reaction cell 10. An anion exchange membrane 14 was disposed at a center of the reaction vessel 13 to separate the vessel into two chambers of the reduction electrode chamber 13A and the oxidation electrode chamber 13B. An electrode formed by performing Au plating on a carbon paper was used as the reduction electrode 11. A nickel plate was used as the oxidation electrode 12. An aqueous solution of 0.5 M $KHCO_3$ was used for the first and second electrolytic solutions 15, 16. An Ag/AgCl (3M NaCl) was used as the reference electrode 81, and it was inserted into the reduction electrode chamber 13A. Besides, $CO_2$ was subsidiarily supplied to the first storage 13A, and Ar was subsidiarily supplied to the second storage 13B.

The solar cell as the first power supply 70 includes a structure where single-crystal Si cells are arranged in six series, and has an open-circuit voltage of 3.5 V. The solar cell 70 was connected to the reduction electrode 11 and the oxidation electrode 12. At this time, the opening/closing switch 71 was provided at a connection line part so that the electrodes 11, 12 and the solar cell 70 were short-circuited. It is thereby possible to prevent an inflow of electric power to the solar cell 70 when the operation is carried out by the second power supply 80. Besides, the ammeter 72 was provided at the connection line part so that the current flowing between the electrodes 11, 12 can be observed. In the potentiostat as the second power supply 80, the working electrode was connected to the reduction electrode 11, the counter electrode was connected to the oxidation electrode 12, and the reference electrode was connected to the Ag/AgCl (3M NaCl) electrode 81.

As the operation method, pseud sunlight (AM1.5, 1000 $W/m^2$) was irradiated on the solar cell 70 for 24 hours by a not-illustrated solar simulator. At this time, the potentiostat 80 was in a short-circuit state. After that, the connections between the solar cell 70 and the electrodes 11, 12 were short-circuited by the opening/closing switch 71, and the potential of the reduction electrode 11 was simultaneously swept between 0.65 V (vs.RHE) and 1.2 V (vs.RHE) by the potentiostat 80. Specifically, the potential was swept from 0.65 V (vs.RHE) which was set as a start potential to 1.2 V (vs.RHE), then swept to 0.65 V (vs.RHE) in a negative direction. This process was set as one cycle, and the cycle was performed for 20 cycles. The sweep rate at this time was 50 mV/s. Evaluations were repeatedly performed for the operation of 24-hour light irradiation and the operation by the potentiostat 80 alternately.

Comparative Example 1

There was prepared a device having the same configuration as the device configuration of the example 1 except that the potentiostat 80 and the reference electrode 81 were not included as an electrochemical reaction device of a comparative example 1. As the operation method, the operation by the potentiostat was not performed, and only the operation of the light irradiation was performed. Other than the above, the same configuration and member as the example 1 were used. Besides, the operation of the light irradiation was constantly performed as the operation method.

The electrochemical reaction devices of the example 1 and the comparative example 1 were evaluated as described below. The gas components discharged from the gas/liquid separation unit 30 on the reduction electrode 11 side were analyzed by the gas chromatograph 32. The gas components observed by the gas chromatograph 32 were CO, $H_2$ and $CO_2$ in both the example 1 and the comparative example 1. After that, temporal Faraday efficiency of CO being the $CO_2$ reduction substance generated at the reduction electrode 11 was calculated. The CO Faraday efficiency was calculated according to the following expression. Note that a CO generation rate was obtained from a gas chromatograph analyzation result, and a value observed by the ammeter was used as a current value. Besides, the number of reaction electrons was set as two.

$$\text{CO Faraday Efficiency [\%]} = \frac{\text{CO Generation Rate [mol/s]} \times \text{Faraday Constant [C/mol]} \times \text{Number of Reaction Electrons}}{\text{Current Value [A]}}$$ [numerical expression 1]

Figure 11:
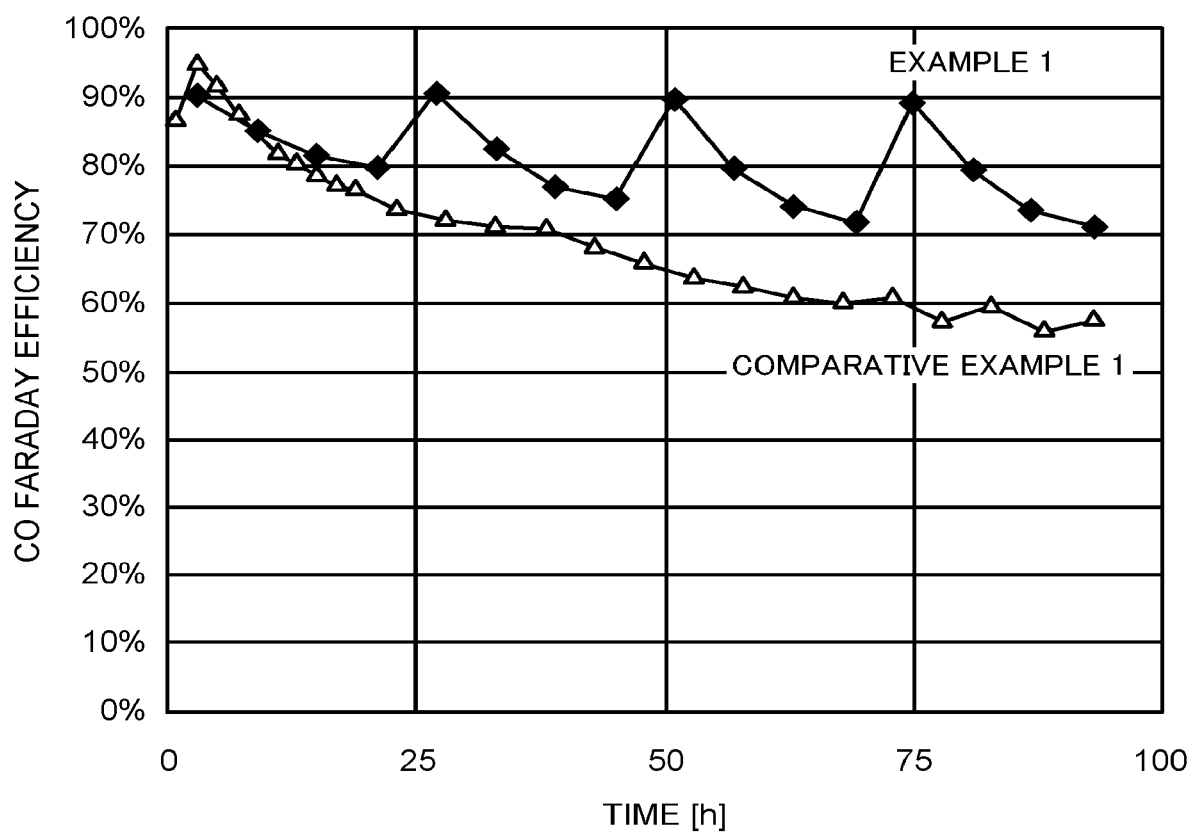
FIG. 11 is a view illustrating a relationship between an operation time and CO Faraday efficiency according to electrochemical reaction devices of the example 1 and a comparative example 1.

Change over time of the CO production amount (CO Faraday efficiency) in each of the example 1 and the comparative example 1 is illustrated in FIG. 11. As it is clear from FIG. 11, continuous lowering of the CO Faraday efficiency could be seen in the comparative example 1. Among the components observed by the gas chromatograph, CO and $H_2$ are the reaction products of the reduction electrode 11, and $CO_2$ is an unreacted gas component. Accordingly, the Faraday efficiency of $H_2$ being a side reaction became large according to the lowering of the Faraday efficiency of CO. This means that activity of the CO generation at the reduction electrode 11 is deactivated. On the other hand, in the example 1, the CO Faraday efficiency was recovered by applying the potential sweep process for the reduction electrode 11 after the 24-hour light irradiation, and the CO Faraday efficiency was constantly 70% or more during the operation. This means that the activity lowering of the catalyst is improved, and high-efficiency $CO_2$ reduction reaction is attained in the electrochemical reaction device and operation in the example 1. Further, the CO Faraday efficiency just after recovery maintains 90% even after the potential sweep processes are repeatedly applied, and therefore, it is conceivable that there is no damage on the reduction electrode 11 due to the potential sweep process in the example 1.

Example 2

Figure 12:
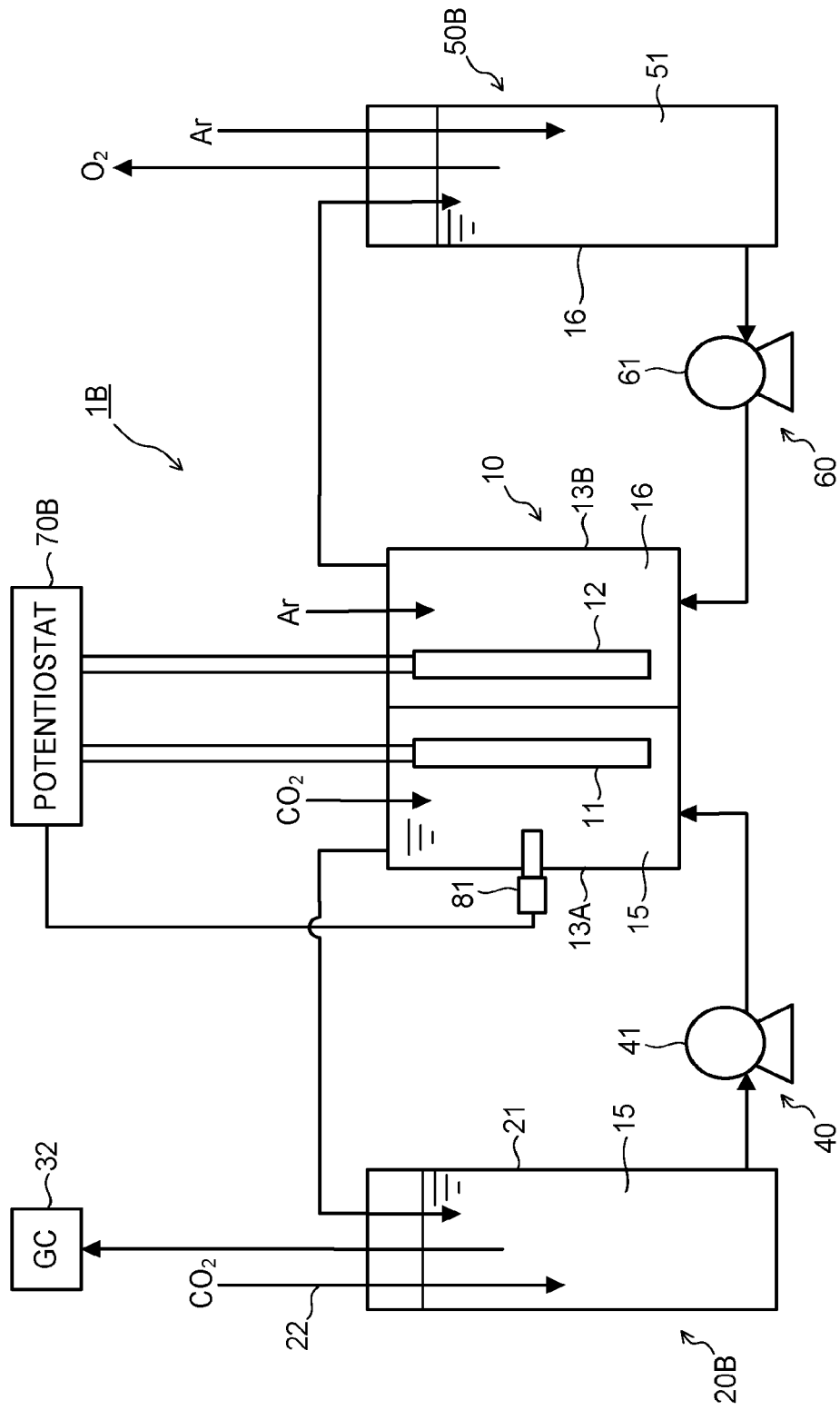
FIG. 12 is a view illustrating an electrochemical reaction device of an example 2.

In an example 2, a common potentiostat 70B was used as the first power supply and the second power supply, and an electrode where an Au nanoparticles supported carbon layer was formed on the carbon paper was used as the reduction electrode 11 to perform the evaluation of the electrochemical reaction device. A configuration of the device used in the example 2 is illustrated in FIG. 12. An electrochemical reaction device 1B illustrated in FIG. 12 includes the electrochemical reaction cell 10, the first circulating system 40, the second circulating system 60, and the common potentiostat 70B as the first power supply and the second power supply. The electrochemical reaction device 1B includes a first gas/liquid mixing and gas/liquid separation unit 20B and a second gas/liquid mixing and gas/liquid separation unit 50B. Further, the first gas/liquid mixing and gas/liquid separation unit 20B includes the gas chromatograph 32 which analyzes the composition of the separated gaseous product. A cyclic voltammetry measurement of the reduction electrode 11 in the reaction cell 10 was performed at the sweep rate of 50 mV/s by using the potentiostat beforehand, then the upper limit potential was 1.35 V (vs.RHE). In the example 2, effects of the activation process operations of the reduction electrode 11 performed by the potentiostat 70B under different conditions were compared.

Example 2-1

The activation process of the reduction electrode 11 by the potentiostat 70B was performed under the following conditions. The lower potential was set to −0.47 V (vs.RHE), the upper potential was set to 1.03 V (vs.RHE), and the potential sweep was applied for the reduction electrode between these two potentials at the sweep rate of 50 mV/s. At this time, the lower potential was set as the start potential, and the sweep was applied up to the upper potential in a positive potential direction, next the sweep was applied up to the start potential in a negative direction. This process was set as one cycle, and this cycle was repeated for 20 times in total.

Example 2-2

The activation process of the reduction electrode 11 by the potentiostat 70B was performed under the following conditions. The lower potential was set to 0.04 V (vs.RHE), the upper potential was set to 1.03 V (vs.RHE), and the potential sweep was applied for the reduction electrode between these two potentials at the sweep rate of 50 mV/s. At this time, the lower potential was set as the start potential, and the sweep was applied up to the upper potential in the positive potential direction, next the sweep was applied up to the start potential in the negative direction. This process was set as one cycle, and this cycle was repeated for 20 times in total.

Example 2-3

The activation process of the reduction electrode 11 by the potentiostat 70B was applied under the following conditions. The lower potential was set to 0.83 V (vs.RHE), the upper potential was set to 0.93 V (vs.RHE), and the potential sweep was applied for the reduction electrode between these two potentials at the sweep rate of 50 mV/s. At this time, the lower potential was set as the start potential, and the sweep was applied up to the upper potential in the positive potential direction, next the sweep was applied up to the start potential in the negative direction. This process was set as one cycle, and this cycle was repeated for 20 times in total.

Example 2-4

The activation process of the reduction electrode 11 by the potentiostat 70B was performed under the following conditions. The lower potential was set to 0.13 V (vs.RHE), the upper potential was set to 1.35 V (vs.RHE), and the potential sweep was applied for the reduction electrode between these two potentials at the sweep rate of 50 mV/s. At this time, the lower potential was set as the start potential, and the sweep was applied up to the upper potential in the positive potential direction, next the sweep was applied up to the start potential in the negative direction. This process was set as one cycle, and this cycle was repeated for 20 times in total.

Comparative Example 2-1

The activation process of the reduction electrode 11 by the potentiostat 70B was performed under the following conditions. The lower potential was set to 0.13 V (vs.RHE), the upper potential was set to 1.93 V (vs.RHE), and the potential sweep was applied for the reduction electrode between these two potentials at the sweep rate of 50 mV/s. At this time, the lower potential was set as the start potential, and the sweep was applied up to the upper potential in the positive potential direction, next the sweep was applied up to the start potential in the negative direction. This process was set as one cycle, and this cycle was repeated for 20 times in total.

Reference Example 2-1

The activation process of the reduction electrode 11 by the potentiostat 70B was performed under the following conditions. The lower potential was set to 0.13 V (vs.RHE), the upper potential was set to 0.63 V (vs.RHE), and the potential sweep was applied for the reduction electrode between these two potentials at the sweep rate of 50 mV/s. At this time, the lower potential was set as the start potential, and the sweep was applied up to the upper potential in the positive potential direction, next the sweep was applied up to the start potential in the negative direction. This process was set as one cycle, and this cycle was repeated for 20 times in total.

Comparative Example 2-2

The activation process of the reduction electrode by the potentiostat 70B was performed by applying a potential to the reduction electrode 11 at an open-circuit potential for 30 minutes.

Comparative Example 2-3

The activation process of the reduction electrode 11 by the potentiostat 70B was performed by applying a constant potential of 0.73 V (vs.RHE) to the reduction electrode for 30 minutes.

Comparative Example 2-4

The activation process of the reduction electrode 11 by the potentiostat 70B was performed by applying a constant potential of 1.03 V (vs.RHE) to the reduction electrode for 30 minutes.

In the examples 2-1 to 2-4, the comparative examples 2-1 to 2-3, and the reference example 2-1, the activation process of the reduction electrode 11 was first performed under respective conditions by the potentiostat 70B. Subsequently, voltage of 2.2 V was applied to the reduction electrode 11 and the oxidation electrode 12 by the potentiostat 70B for three hours. This process was repeated for three times. As a result of analyzation by the gas chromatograph 32 of the gas discharged from the gas/liquid mixing and gas/liquid separation unit 20B on the reduction electrode 11 side when the potentiostat 70B was in operation, all of the gas components observed in the examples, comparative examples, and reference example were CO, $H_2$, and $CO_2$. CO is the reduction substance of $CO_2$, and $H_2$ is a by-product. $CO_2$ is the unreacted gas component. The evaluation was performed by quantifying the production amount of CO discharged from the gas/liquid mixing and gas/liquid separation unit 20B on the reduction electrode 11 side after 30 minutes from the operation start time by the potentiostat 70B, normalizing the production amount of CO observed for the first time as one, and comparing with the production amounts at the second time and the third time, to thereby compare variation of the CO production amount in accordance with the repeated activation processes. Results thereof are illustrated in Table 1.

TABLE 1

| | Activation Process Conditions | | Production Amount Of Co (Relative Value) | | | |
|---|---|---|---|---|---|---|
| | Lower Electrode [V(vs. RHE) | Upper Electrode [V(vs. RHE)] | First Time | Second Time | Third Time | Result |
| Example 2-1 | −0.47 | 1.03 | 1.00 | 1.00 | 1.00 | Kept |
| Example 2-2 | 0.04 | 1.03 | 1.00 | 1.00 | 0.99 | Kept |
| Example 2-3 | 0.83 | 0.93 | 1.00 | 0.99 | 1.01 | Kept |
| Example 2-4 | 0.13 | 1.35 | 1.00 | 1.00 | 1.00 | Kept |
| Comparative Example 2-1 | 0.13 | 1.93 | 1.00 | 0.98 | 0.95 | Lowered |
| Reference Example 2-1 | 0.13 | 0.63 | 1.00 | 0.74 | 0.69 | Lowered |
| Comparative Example 2-2 | Open-Circuit Voltage, 30 min | | 1.00 | 0.80 | 0.67 | Lowered |
| Comparative Example 2-3 | (Constant Potential 0.73 V (vs. RHE), 30 min) | | 1.00 | 0.95 | 0.85 | Lowered |
| Comparative Example 2-4 | (Constant Potential 1.03 V (vs. RHE), 30 min) | | 1.00 | 0.92 | 0.89 | Lowered |

As it is clear from Table 1, the production amount after the process was kept even after the repeated activation processes in each of the examples 2-1 to 2-4. On the other hand, it was verified that the second time production amount and the third time production amount are lowered in stages due to the activation process in each of the comparative examples 2-1 to 2-4. This means that the condition of the activation process affects recovery behavior due to the repeated activation processes. For example, when the activation process was performed not by the potential sweep but by applying the constant potential for a fixed period of time such as the comparative examples 2-3, 2-4 as the activation method, the effect of activation cannot be obtained. Besides, as it can be seen from the comparative example 2-1, the continuous recovery effect could not be obtained when the activation process was performed repeatedly under the condition where the upper potential is higher than the upper limit potential. Note that the recovery effect by the activation process could not be sufficiently obtained when the upper potential was too low as illustrated in the reference example 2-1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device, comprising:
a reaction tank which includes a first storage to store a first electrolytic solution containing carbon dioxide, and a second storage to store a second electrolytic solution containing water;
a reduction electrode, which is disposed at the first storage of the reaction tank, to reduce carbon dioxide and thus generate a carbon compound;
an oxidation electrode, which is disposed at the second storage of the reaction tank, to oxidize water and thus generate oxygen;
a counter electrode which is used for potential sweep using the reduction electrode as a working electrode;
a first power supply, which is electrically connected to the reduction electrode and the oxidation electrode, to generate the carbon compound and oxygen; and
a second power supply, which is electrically connected to the reduction electrode and the counter electrode, to sweep a potential between an upper potential and a lower potential,
wherein the reduction electrode contains at least gold and carbon, and,
wherein the second power supply is configured to apply the potential between the upper potential of 0.93 V (vs.RHE) or more and 1.4 V (vs.RHE) or less and the lower potential of 0.83 V (vs.RHE) or less to the reduction electrode and the counter electrode, and the upper potential is no more than an oxidation potential of the reduction electrode.

2. The device according to claim 1, further comprising:
a reference electrode which is electrically connected to the second power supply.

3. The device according to claim 1, wherein the oxidation electrode is configured to use as the counter electrode.

4. The device according to claim 1, further comprising:
an ion exchange membrane which is provided to separate between the first storage and the second storage.

5. The device according to claim 1, wherein the upper potential is no more than an upper limit electrode $E_{UL}$ which is found by the following expression $$E_{UL}[V] = 4 \times 10^{-4} \times \text{sweep rate [mV/s]} + 1.3063.$$

6. An electrochemical reaction method, comprising:
applying current from a first power supply to a reduction electrode which is contact with a first electrolytic solution containing carbon dioxide and an oxidation electrode which is contact with a second electrolytic solution containing water, generating a carbon compound by reducing carbon dioxide on the reduction electrode side, and generating oxygen by oxidizing water on the oxidation electrode side; and
sweeping a potential between a first upper potential and a first lower potential by using a second power supply which is electrically connected to the reduction electrode as a working electrode and a counter electrode,
wherein the reduction electrode contains at least gold and carbon, and
wherein the potential sweeping is performed by applying the potential between the first upper potential of 0.93 V (vs.RHE) or more and 1.4 V (vs.RHE) or less and the first lower potential of 0.83 V (vs.RHE) or less to the reduction electrode and the counter electrode, and the first upper potential is no more than an oxidation potential of the reduction electrode.

7. The method according to claim 6, further comprising:
sweeping a potential between a second upper potential and a second lower potential,
wherein the potential sweeping is performed by applying the potential between the second upper potential exceeding 1.4 V (vs.RHE) and the second lower potential of 0.83 V (vs.RHE) or less to the reduction electrode and the counter electrode, and
wherein a time of the potential sweeping between the second upper potential and the second lower potential is shorter than a time of the potential sweeping between the first upper potential and the first lower potential.

* * * * *